No. 893,226. PATENTED JULY 14, 1908.
E. CHILDS.
MACHINE FOR UNITING CHAIN LINKS.
APPLICATION FILED JULY 15, 1904.
2 SHEETS—SHEET 1.
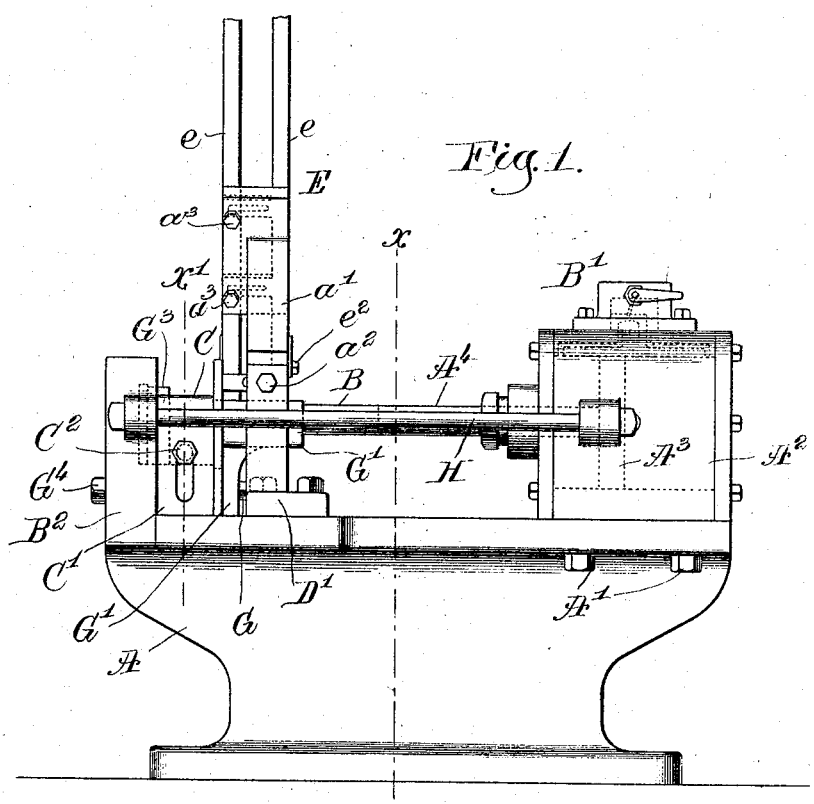
Fig. 1.
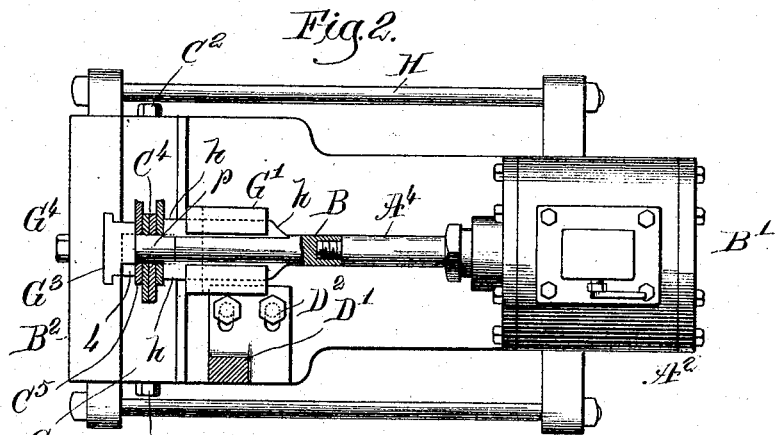
Fig. 2.
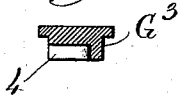
Fig. 2.a
Witnesses.
Thomas J. Drummond.
J. W. H. Lutton.
Inventor.
Eugene Childs,
by Crosby Gregory,
Attys.

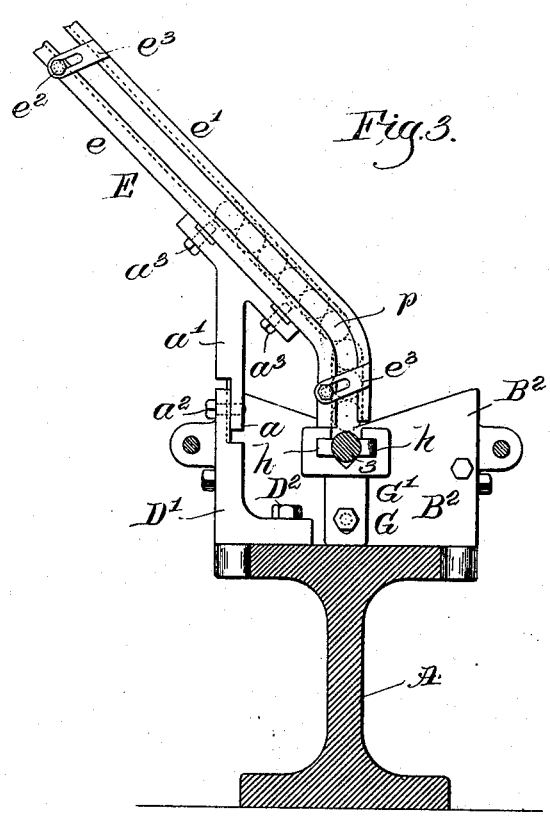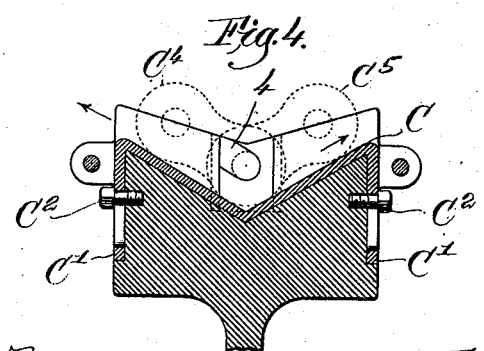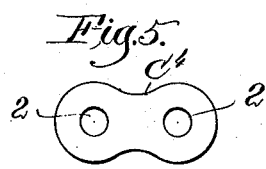

UNITED STATES PATENT OFFICE.

EUGENE CHILDS, OF BOSTON, MASSACHUSETTS, ASSIGNOR TO TRIMONT MANUFACTURING COMPANY, OF BOSTON, MASSACHUSETTS, A CORPORATION OF MAINE.

MACHINE FOR UNITING CHAIN-LINKS.

No. 893,226.  Specification of Letters Patent.  Patented July 14, 1908.

Application filed July 15, 1904. Serial No. 216,649.

*To all whom it may concern:*

Be it known that I, EUGENE CHILDS, a citizen of the United States, and residing in Boston, in the county of Suffolk and State of Massachusetts, have invented an Improvement in Machines for Uniting Chain-Links, of which the following description, in connection with the accompanying drawings, is a specification, like letters on the drawings representing like parts.

This invention has for its object the production of a novel mechanism for uniting together the flat links of chains.

In accordance with my invention the links are laid in a positioning member that co-acts with the ends of the links to be united together, to so position said links that the holes previously made therein shall stand in substantial alinement.

The machine also comprises a raceway for conducting pins or studs into a pin sustainer that occupies a position in alinement with the holes in the links to be united, and a plunger that may be moved automatically by compressed air or otherwise to strike the pin and drive the same from the sustainer through the alined holes in the links.

The mechanism has an abutment for sustaining the outer side of that link to be entered by the pin which is farthest from the plunger so that the pin may be pushed through the assembled plurality of links as said links are supplied to the link positioning means. The ends of the pins project at each side of the chain, the chain being especially desirable for use in connection with pipe-wrenches and for sprocket-chains.

Figure 1 in side elevation represents a machine embodying my invention; Fig. 2 is a top or plan view thereof with the raceway removed and showing in section the links to be joined by the pins; Fig. 2$^a$ is a cross section of the abutment; Fig. 3 is a section on the line $x$, looking to the left; Fig. 4 is a section in the line $x'$, looking to the left; Fig. 5 shows one link detached, and Fig. 6 shows several links united in a chain.

In the drawings A represents the framework or base on which is erected the working parts to be described. The base has connected therewith by suitable bolts A' a cylinder A$^2$ containing a piston A$^3$ shown by dotted lines from which extends a piston-rod A$^4$ shown as having connected with it by screw threads see Fig. 2, a plunger B.

Mounted on the cylinder is a valve-box B' having usual valves to permit the entrance of say, compressed air into the cylinder whenever it is desired to move the piston and plunger to force a pin through the punched holes in a link and to retract the plunger and piston-rod. The left hand end of the frame work of the base is represented as provided with an upright B$^2$, the upper side of which is cut away as represented in Figs. 3 and 4. This cut away portion receives a link positioning device C represented as having oppositely inclined faces and downturned ends C', each end being slotted to receive a set-screw C$^2$ so that when said set-screws are relaxed the positioning device may be adjusted vertically to correspond with the size of the links C$^4$, C$^5$ to be united. One of these links is shown detached in Fig. 5, where it will be seen that it has at its opposite ends like holes 2. The bed also has erected upon it a stand D' secured thereto, as shown, by set-screw D$^2$. This stand is notched at its upper end to receive a projection $a$ of a stand $a'$, the stands D' and $a'$ being connected adjustably by set screw $a^2$ extended through a slot at the upper end of the stand D'.

The upper end of the stand $a'$ is provided with screws $a^3$ that enter and sustain part of the raceway E having a bottom portion $e$ and a top portion $e'$, said portions being united by screws $e^2$ entering slots in ears $e^3$ connected as shown with the top part $e'$, so that the top part may be adjusted with relation to the bottom part to accommodate pins $p$ of the diameter to be used, that depending upon the size of the links that are to be united.

To the right hand side of the upright portion B$^2$, see Fig. 3, I have connected adjustably by a set screw G the pin-sustainer G', it having a V-shaped notch 3 in which each pin as it is dropped from the raceway E enters, the sides of said notch positioning the pin whatever its diameter centrally with relation to the holes in the links that are to be united.

The end of the plunger in its forward movement meets the pin sustained in the notch and drives said pin as represented in Fig. 2, forcing the same through the alined holes in the several links, the end of the pin entering a space 4, see Fig. 4, in the abutment G$^3$ held in its adjusted position by a screw G$^4$. The abutments are made interchangeable and the depth of the space 4 in each abutment will vary according to the length it is desired that the pins $p$ project beyond the outer links of the chain. The space 4 is open at one side that the end of the pin driven therein and arrested at a defined point may move out of said space as the length of the chain is increased. The front side of the abutment serves as a gage to insure that the outer side of the outermost link contacting with said gage is located at exactly the proper distance from the end of the pin.

The plunger B has two oppositely placed wings $h$ that project beyond the end thereof, said wings, as the piston is moved forward to drive the pin $p$, meeting the outside of that link next the plunger and forcing all the links closely together, causing the farthest link to be jammed against the gage referred to.

By making the positioning device with the two oppositely-inclined faces, I have provided a positioning device which operates to position each link both longitudinally and transversely thereof. Referring to Fig. 4, it will be seen that each of the links rests on both of the inclined faces, the side of each link resting on one inclined face and the end of the link resting against the other inclined face. By this means the links are correctly and automatically positioned both longitudinally and transversely thereof to bring the holes of the overlapping ends of the links in alinement.

In operating the machine, the positioning device C will first be adjusted vertically so that the alined holes of the links placed thereon will come in the line of travel of the plunger, and a plurality of pins will then be placed in the raceway, the lowest pin gravitating to the bottom of the raceway and being sustained in the notch 3, as shown in Fig. 3. The links to be united are then placed on the positioning device, as shown in dotted lines Fig. 4, and the compressed air, gas or other motive fluid, will be admitted in the cylinder and will drive the piston rod and plunger forward so that the plunger meets the end of the pin sustained in the notch 3 and forces the same powerfully through the alined holes in the links to be made into a chain, forcing the end of the pin into the space 4. As the pin enters the links to be connected, the wings of the plunger meet the nearest link and force the links closer together as stated. The cylinder $A^2$ and uprights $B^2$ are united by tie-rods H. The pins are forced tightly into the alined holes of the links, and with a series of said links to form a chain.

Assuming that two sets of links have been united as described, and that it is desired to produce a long chain, to do this the sets of links riveted together will be moved in the direction of the arrow, so that the last set of links (for instance those shown at $C^5$, Fig. 4) assume the position on the positioning device that is occupied by the links $C^4$, Fig. 4, and then other links will be laid on the inclined face of the positioning device C, causing said links to form the free ends of the set of links $C^5$.

Fig. 6 shows part of a chain such as may be made by the machine herein described, the chain presenting a width of four links, the outer links being designated $C^5$ and the central links $C^4$.

I have illustrated in the drawings and described in the specification one embodiment only of the invention.

Having described my invention, what I claim as new and desire to secure by Letters Patent, is:—

1. In a machine for uniting chain links, the combination with a link-positioning device having two link-receiving faces inclined downwardly toward each other and each adapted to sustain a link on its edge with the hole therein extending horizontally, said faces being arranged to position the two links with the holes in alinement, of means to force a pin through the alined horizontal holes in the links, and an abutment to prevent lateral movement of the links.

2. In a machine for uniting chain-links, link positioning means, a pin-sustainer, a plunger, means to move the same automatically in a defined line, means to adjust said positioning device according to the size of the links to place the holes in the line of movement of the plunger, and means to adjust the pin sustainer that it may sustain the pin to be driven, in line with the alined holes of the links.

3. In a machine for uniting chain-links, a stationary positioning device to sustain the links to be united so that the holes therein are placed in alinement, an abutment to contact with the outer side of an outermost link, said abutment presenting a pin-receiving space open at one side, means to sustain a pin; a plunger, and means to actuate the same automatically to drive the pin into and through the alined holes of the links, the outer end of the pin being projected beyond the outer link of the chain and entering the space in said abutment.

4. In a machine for uniting chain-links, means to position the links with the holes therein in alinement, means to sustain a pin, an abutment presenting a recess to receive the outer end of a pin, and a plunger constructed to act on one end of said pin and also on the link of the pin next to said plunger and force all the links of the chain in close contact during the driving of the pins through said links.

5. In a machine for uniting links in the formation of a chain, a stationary positioning device to position the overlapping ends of the links to be united, means to sustain a pin in line with the alined holes of the links, a plunger, means to move the plunger to force a pin through the alined holes, and an abutment against which the links rest, said abutment having an open-sided recess to receive the end of the pin.

6. In a machine for uniting chain links, means to position the links to be united with the holes therein in alinement, combined with means to force a pin through the alined holes, and an abutment to prevent lateral movement of the links, said abutment having an open-sided recess to receive the end of the pin.

7. In a machine for uniting chain links, the combination of link-positioning means and an abutment against which the sides of the link rest, with a plunger to force a pin through the alined holes in the positioned links, said plunger having shoulders to engage the side of one of the links and operating to force the links together laterally.

In testimony whereof, I have signed my name to this specification, in the presence of two subscribing witnesses.

EUGENE CHILDS.

Witnesses:
GEO. W. GREGORY,
MARGANE A. DUNN.